United States Patent
Boyd et al.

(10) Patent No.: US 8,808,806 B2
(45) Date of Patent: Aug. 19, 2014

(54) INKS AND COATINGS THAT PREVENT THE MIGRATION OF HEAVY METALS

(75) Inventors: Craig Boyd, North Aurora, IL (US); Saverio Lucci, Clifton, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 239 days.

(21) Appl. No.: 13/122,201

(22) PCT Filed: Oct. 1, 2009

(86) PCT No.: PCT/US2009/059210
§ 371 (c)(1),
(2), (4) Date: Apr. 1, 2011

(87) PCT Pub. No.: WO2010/039943
PCT Pub. Date: Apr. 8, 2010

(65) Prior Publication Data
US 2011/0177251 A1      Jul. 21, 2011

Related U.S. Application Data

(60) Provisional application No. 61/102,422, filed on Oct. 3, 2008.

(51) Int. Cl.
*B05D 3/00*    (2006.01)
(52) U.S. Cl.
USPC ............... 427/385.5; 427/389.7; 427/421.1; 427/427.4
(58) Field of Classification Search
None
See application file for complete search history.

(56) References Cited

U.S. PATENT DOCUMENTS

| 2,512,929 | A | * | 6/1950 | Galbraith et al. | ................. 65/23 |
| 5,621,021 | A | | 4/1997 | Yoshioka et al. | |
| 6,203,720 | B1 | | 3/2001 | Thames et al. | |
| 6,582,805 | B1 | * | 6/2003 | Moh et al. | ................. 428/207 |
| 2003/0153666 | A1 | * | 8/2003 | Farooq | ................. 524/430 |
| 2007/0184200 | A1 | * | 8/2007 | Bell | ................. 427/407.1 |

FOREIGN PATENT DOCUMENTS

| EP | 0556668 A1 | 8/1993 |
| JP | 08-143814 A | 6/1996 |
| JP | 2000-109768 A1 | 4/2000 |
| JP | 2001220179 A | 8/2001 |

OTHER PUBLICATIONS

Abstract and partial machine translation of JP 08-143814, Jun. 1996.*
International Search Report, mailed Dec. 15, 2009.
English language machine translation of Japanese Patent Pub. No. JP-08-143814-A (Item AA), published Jun. 4, 1996 [6 pages].
English language machine translation of Japanese Patent Pub. No. JP-2000-109768-A1 (Item AB), published Apr. 18, 2000 [12 pages].

* cited by examiner

*Primary Examiner* — Erma Cameron
(74) *Attorney, Agent, or Firm* — Charles C. Achkar; Ostrolenk Faber LLP

(57) ABSTRACT

A composition which cures in ambient conditions to form a film substantially impenetrable to heavy metals, contains water, a water-miscible organic solvent, a water-borne primary resin having a glass transition temperature of 25 degrees C. or less, and a hydrophobic surfactant.

19 Claims, No Drawings

INKS AND COATINGS THAT PREVENT THE MIGRATION OF HEAVY METALS

This disclosure claims the benefit of U.S. Provisional application Ser. No. 61/102,422, filed Oct. 3, 2008.

BACKGROUND

The application of coatings to glass containers to obtain increased mechanical strength, shatter resistance, scratch resistance during shipping and handling, increased number of recirculation cycles, resistance to fingerprints, and the like has been practiced for a long time. See, e.g., U.S. Pat. No. 3,944,100, EP 1,178,021, WO 2005/049219 and EP 1,555,249. In some cases, the coating has been applied to inhibit metal release from the glass or the container contents. For example, U.S. Pat. No. 5,592,044 uses a coating comprising a hydrolytic condensation product of a cross-linkable organo-functional hydrosilicon, a metal compound and an organic prepolymer cross-linkable with the hydrosilicon, to reduce lead leaching from lead crystal glass. US 2004/0199138 uses a silicone coating to prevent glass container leaching of aluminum from aluminum-containing pharmaceutical solutions therein.

The inks or paints in labels printed or affixed onto consumer goods containers frequently contain heavy metals, especially lead. The presence of these heavy metals can lead to hazardous exposure levels to consumers. Applied ceramic labels (ACLs) is an example of one such place where the presence of heavy metals can be found. ACLs are commonly used on various containers, and particularly on glass beverage bottles. Applied ceramic labeling is a process where ceramic inks are printed directly onto a bottle, often by screen printing. The bottles are subsequently heated sufficiently to fuse the ink directly to the bottle, creating a permanent decoration.

SUMMARY OF THE INVENTION

The present invention is drawn to water based inks and coatings that have been developed for application as an overprint to the exterior of glass bottles upon which labels, especially ACLs, have been affixed. The inventive inks and coatings serve as a barrier which substantially prevents the release of heavy metals, especially lead, from the labels. The present invention is not limited to ACLs, however, and will serve as a barrier to prevent the release of heavy metals and other materials from the containers themselves as well as from virtually all types of labels and decals typically used on consumer goods containers and packages. This includes labels that are direct printed onto the container as well as those printed onto paper, foil, plastic and the like, and later applied to the container.

The composition contains, in addition to water, a water-miscible solvent, a water borne-resin, a surfactant and optionally a modifying resin, and optionally a plasticizer, which preferably cures by air drying at ambient temperature. The method of making and using the composition is also part of this invention.

DETAILED DESCRIPTION OF THE INVENTION

This invention is directed to a composition, a method of making the composition, and methods of using the composition. The composition is water-based, and also contains a water-miscible solvent, a water borne-resin, a surfactant and optionally a modifying resin, and optionally a plasticizer, which preferably cures by air drying at ambient temperature. It is transparent but may contain a colorant.

The inventive inks and coatings can be applied under virtually any ambient conditions typically found in a consumer goods packaging or bottling facility. Further, the inventive inks and coatings preferably can be air-dried and do not require dryers or ovens for curing. Preferably the ink or coating air dries in less than 3 minutes, and more preferably in about 2-2.5 minutes. The most practical method for applying the composition is by spray coating the entire exterior of a bottle such that it completely covers the ACL as well as the bottle itself. Alternatively, the coating can be selectively applied to only the desired areas of the bottle and/or label.

The preferred spray coating method of application of the inventive compositions provides a clear (non-pigmented), transparent, virtually invisible, glossy, barrier film over a substrate, such as an applied ceramic label (ACL) on the exterior of a glass bottle. After curing, the composition forms a film that acts as a barrier that is substantially impenetrable to the migration or leaching of heavy metals, especially lead, from the ACL. Other heavy metals that can be prevented from migration include, but are not limited to: chromium (including hexavalent chromium); cadmium; mercury; and aluminum. Substantially impenetrable is defined as "no detection" of heavy metal extractables, by which is meant <1.000 ug/test sample as tested by NIOSH testing method 9100 using inductively Coupled Argon Plasma (ICAP) following EPA method 200.7.

In other embodiments of the present invention, the composition can be formulated with suitable viscosity and rheological properties for use as a printing ink or coating that can be applied by dip, brush, flexographic, lithographic, gravure or roller operations. Other possible embodiments of the inventive ink or coating compositions include the following: may contain colorants (pigments and/or dyes); may be rendered opaque or translucent with the use of suitable pigments, dyes or fillers, or combinations of same; may have a high gloss, semi-gloss, matte or semi-matte finish imparted by the use or absence of matting agents or powders; can be either air-dried or cured with ovens or other means of heating; and has the suitable resistance and adhesion properties for use on a variety of substrates. Though the inventive compositions are particularly suited for glass and ACLs, other possible substrates include rigid and flexible plastics, wood, paper & board, metallics and any other porous or non-porous substrate upon which the ink or coating compositions exhibits acceptable adhesion.

The inventive ink or coating compositions are comprised of water, solvent, a primary resin, a surfactant and optionally a modifying resin, and optionally plasticizer and additives. Preferably, any solids present have a major dimension of less than 0.0025 cm, and more preferably less than 0.0017 cm.

The composition contains about 5% to about 40%, preferably about 15-20%, of water. The water may be, for example, tap water, by which is meant water obtained from a public water source. Spring water, distilled or otherwise purified water, can also be used.

The composition also contains about 10% to about 75%, preferably about 30-40% of a water-miscible fast drying organic solvent, i.e., one which dries faster than water. Preferably, the organic solvent is one or more aliphatic alcohol, more preferably, a $C_1$ to $C_8$ aliphatic alcohol, and most preferably ethanol, is employed. The alcohol acts as a solvent, primarily for the surfactant which is also present in the composition. However, any fast drying organic solvent that is miscible with water can be used alone, in combination, or in combination with the alcohol.

The composition of the present invention further contains about 5% to about 70%, preferably about 35-45%, of a waterborne resin, such as acrylics and polyurethanes, which dry to form a transparent or translucent film. Such resins have a low glass transition temperature (Tg) so that a continuous barrier film can be formed at ambient temperature. The Tg is accordingly 25° C. or lower, and preferably 0° C. or less. The preferred resin is a water-borne acrylic or acrylic emulsion resin with a substantially neutral pH, i.e., a pH of about 6.5-7.5, which imparts good film adhesion and excellent transparency. A preferred resin is Lucidene® 4045 available from Rohm and Haas, which is a low odor translucent styrene-acrylic emulsion with the following properties: Tg=−30° C.; acid number=90, pH range of 6.8-7.5. Another suitable resin is Lucidene® 4035, another styrene-acrylic from Rohm and Haas.

The composition may also contain a modifying resin, although this is not required. The modifying resin may be the same type of resin as the water borne resin but with a higher Tg in order to impart additional functional/structural characteristics, such as increased durability, hardness and adhesion for high performance applications. Preferably the Tg is at least 30° C. Examples of possible modifying resins include, but are not limited to, styrene acrylics such as: Joncryl 77 (S.C. Johnson & Son, Inc); Lucidene 243; and Lucidene 4015 Plus (Rohm and Haas). These modifying resins can be added in any amount or combination depending on the desired end use properties. When present, the modifying resin will generally be up to about 20%.

A further constituent of the composition is one or more hydrophobic surfactants which will inhibit water vapor from forming on the bottles during drying. It will also allow the ink or coating to wet out smoothly and uniformly on the glass and label surface. Such surfactants usually have an HLB of 7.0 to 18.0, and preferably from about 8.6 to 15.0. The surfactant is preferably nonionic and may be a perfluoroalkyl-containing oligomer, such as SC101, SC102, SC103, SC104, SC105 and SC106, all from Asahi Glass Co., Ltd.; and Glycomul L, from the Lonza Corp. Other preferred surfactants include sorbitan monolaurate, sorbitan monostearate and their ethoxylates which preferably containing 1-20 moles of ethylene oxide. The surfactant is generally about 0.1% to about 8%, and more preferably about 2-7%.

Optionally, a plasticizer may also be part of the composition to provide flexibility and durability in an amount of up to 10%. Suitable plasticizers include polycarboxylic acid plasticizers, phthalate based plasticizers, trimetallate plasticizers, adipate-based plasticizers, sebacate-based plasticizers, sulfonamide plasticizers, benzoate plasticizers, maleate plasticizers, benzoate plasticizers, organophosphate plasticizers, epoxidized vegetable oil plasticizers, glycol/polyether plasticizers, nitrobenzene plasticizers, acetylated monoglyceride plasticizers, and alkyl citrate plasticizers.

The composition may also include all types of additives known to be suitable for use in inks, paints and coatings, including, but not limited to: silicone and non-silicone defoamers and levelling agents; cure accelerators; fire-retardants; slip-resistance additives; rub resistance additives; chemical resistance additives; adhesion promoters; printability additives; cure/drying accelerators; rheological modifiers; preservatives (e.g. biocides, fungicides); and the like.

The preferred embodiment of the compositions of the present invention is as a clear, non-pigmented coating. Nevertheless, it is also possible for the compositions to contain colorants. Any typical pigment or dye, or combinations thereof typically used in printing inks, paints and coatings, can be used as colorants in these compositions. The pigment may be organic, inorganic, or combinations thereof. Typical pigments include but are not limited to azo, azomethine, methine, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine and quinophthalone, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, or solid solutions thereof.

Another aspect of the present invention is a method for forming a cured coating that is substantially impenetrable to leaching or migration of heavy metals especially lead, by coating a substrate with the ink or coatings composition of the present invention and allowing said compositions to cure thus forming a film that serves as a barrier to heavy metal migration or leaching. A preferred curing method is air drying in ambient conditions such as those found in typical bottling facilities. This method is especially suitable for creating a barrier film which substantially prevents the migration of heavy metals (especially lead) when printed over the top of labels, such as applied ceramic labels (ACLs), on substrates such as glass. The cured ink or coating film is preferably transparent and does not obscure the label. In the method of the present invention, the conditions under which the coating will cure does not have to be elevated temperature. The coating may be air-dried under ambient conditions, by which is meant any ambient conditions typically found in a printing or bottling manufacturing environment. If desired to affect faster cure, elevated temperatures can be employed, such as those found in a forced-air oven, etc.

In the preferred method for applying the inventive coatings, the entire exterior of the bottle, including the labels, is typically spray coated such that the labels are clearly visible and any lead in the labels is prevented from release. Alternatively, the spray coating can be selectively applied to only the labels or other areas of the bottle.

Accordingly, the composition may be sprayed over the exterior of a labeled bottle and allowed to dry, forming a clear coat over the bottle that prevents any lead migration from the label. The ink/coating can be applied and will dry and cure in the ambient conditions of a bottling operation. Generally, the coating will cure by air-drying within about five minutes, possibly faster depending on conditions. After curing, the bottles can immediately be filled with product, such as cold beverage, if desired.

Any typical spray device or application known in the art can be used to apply the ink or coating compositions of the present invention. A preferred spraying device is a hydraulic spray gun which can be set up over a line of single file bottles in such a way as to minimize overspray. For example, one or more spray heads may be placed in an enclosure which admits one bottle at a time and has a slit just wide enough for one bottle. Any number of spray heads within the limits of the operation may be used. Two to six spray heads per enclosure works well. The spray tip head of the hydraulic spray gun should preferably be about 0.001 inches (ca. 0.0025 cm) or less, for example about 0.00067 inches (ca. 0.002 cm). The tank pressure of the spray gun may be any reasonable amount from about 50 to about 200 psi (35-140 kg/cm$^2$), typically in the range of about 90-110 psi (63-77 kg/cm$^2$).

This system can be adapted for any reasonable line speed by controlling pressure and placement, but a line speed on the order of 60 bottles per minute is typical. It may be modified to accommodate different types of bottling operations. For example, the placement and angle diameter of spray heads can be modified to accommodate different bottle sizes, shapes and configurations.

Another aspect of the present invention is a method for making the inventive compositions listed above. The composition of this invention is preferably made as follows: the surfactant is dissolved in alcohol (elevated temperature may speed the dissolving process but is not necessary); to the resultant solution, water is added; the resultant solution is slowly added to the primary acrylic emulsion resin while stirring.

In order to further illustrate the present invention, various non-limiting examples are set forth below. In these, as throughout the remainder of this specification and claims, all parts and percentages are by weight, and all temperature are in degrees Centigrade.

EXAMPLES

Example 1

Spray Coating

Formulation

| | |
|---|---|
| 43.20% | Lucidene 4045 Acrylic Emulsion |
| 4.50% | SC106 Surfactant |
| 34.70% | Ethyl Alcohol |
| 17.60% | Tap Water |

The SC106 surfactant was dissolved in the ethyl alcohol in a container. The water was them added to the alcohol/SC106 mixture. The Lucidene 4045 was placed in a clean container, and the alcohol/SC106/water mixture was added to the Lucidene slowly while mixing to prepare a spray coating composition.

The spray coating composition thus prepared was applied using 4 hydraulic spray guns with 0.00067 inch (ca. 0.002 cm) spray tip heads, and a tank pressure of 100 psi (75 kg/cm$^2$). The spray coating was applied at a bottling plant at an area where the bottles labeled with an ACL, were positioned in a single file line. The entire bottle, including the applied ceramic labels were coated with at a line speed set at 60 bottles/minute. The spray heads were placed in an enclosure with a slit just wide enough for the bottles to pass through to minimize overspray. The bottles were allowed to air dry for about 2.5 minutes, then filled with cold beverage (−50° F.; ca. 11° C.), and then placed into a humidity chamber set at 110° F. (ca. 43° C.) and 80% relative humidity (RH) for one hour to simulate ambient bottling conditions. These are extreme conditions adopted for test purposes, and the inventive coatings performed equally well under non-elevated temperature and RH conditions. The bottles were then removed from the humidity chamber and allowed to sit for 24 hours to ensure adequate post-cure of the inventive coatings. Other post-cure dwell times can also be used. Optionally, the coatings could be cured at elevated temperatures (>ca. 150° F.-ca. 67° C.) for 5-10 minutes to eliminate this step. Alternatively, the 24 hour dwell time can be eliminated when curing under elevated temperature. The bottles were subsequently tested for lead migration following NIOSH testing method 9100 using inductively Coupled Argon Plasma (ICAP) following EPA method 200.7. For comparison purposes, "CONTROL" bottles which were identical to the test bottles in every way except that they were not spray coated were set aside.

The bottles were graded as pass or fail based on the following criteria:
Pass—no detection of lead migration (<1.000 ug/Bottle)
Fail—a detection of lead migration (>1.000 ug/Bottle)
Lead Detection—Test Results

| Trial Testing Results from Example 1 | | |
|---|---|---|
| Bottle Number | Lead Detection Level | Pass/Fail |
| D4 | No Detection | Pass |
| D2 | No Detection | Pass |
| D3 | No Detection | Pass |
| D1 | No Detection | Pass |

| Trial Testing Results from Control Bottles (No Inventive Coating Applied) | | |
|---|---|---|
| Bottle Number | Lead Detection Level | Pass/Fail |
| Control 1 | 6.5 ug/Bottle | Fail |
| Control 2 | 25 ug/Bottle | Fail |

Examples 2-5

The following formulations are prepared following the procedure described in Example 1.

| | |
|---|---|
| Lucidene 4045 | 45% |
| Sorbitan monolaurate | 8% |
| Ethyl Alcohol | 30% |
| Tap water | 17% |
| Lucidene 4045 | 35% |
| Lucidene 4015 | 10% |
| Sorbitan monolaurate ethoxylated with 10 moles ethylene oxide | 8% |
| Ethyl Alcohol | 30% |
| Tap water | 17% |
| Lucidene 4045 | 25% |
| Joncryl 77 | 20% |
| Sorbitan monostearate ethoxylated with 15 moles ethylene oxide | 8% |
| Ethyl Alcohol | 30% |
| Tap water | 17% |
| Lucidene 4045 | 40% |
| Lucidene 243 | 15% |
| Sorbitan monolaurate | 0.7% |
| Ethyl Alcohol | 34% |
| Tap water | 10.3% |

Various changes and modifications can be made in the present invention without departing from the spirit and scope thereof. The embodiments set forth herein were for the purpose of illustration only, and were not intended to limit the invention.

What is claimed is:
1. A method, comprising:
applying to a substrate a composition comprising:
water,
a water-miscible organic solvent,
a water-borne (i) polyurethane, (ii) substantially neutral acrylic, or (iii) substantially neutral acrylic emulsion resin, each of the (i) polyurethane, or (ii) substantially neutral acrylic, or (iii) substantially neutral acrylic emulsion resin having a Tg of 25° C. or less,
optionally a modifying resin having a Tg higher than that of the water-borne resin, and
a hydrophobic surfactant; and curing the composition to form a film substantially impenetrable to heavy metal.

2. The method of claim 1, wherein the curing is effected by air drying under ambient conditions.

3. The method of claim 1 in which the composition comprises about 5-40 wt % water, about 10-75 wt % water-miscible organic solvent, about 5-70 wt % water-borne (i) polyurethane, (ii) substantially neutral acrylic, or (iii) substantially neutral acrylic emulsion resin, about 0.1-8 wt % surfactant, 0 up to 20 wt % modifying resin having a Tg higher than that of the water-borne resin, 0 up to 10 wt % plasticizer, and does not contain solids having a major dimension greater than 0.0025 cm.

4. The method of claim 3 in which the composition comprises about 15-20 wt % water, about 30-40 wt % ethanol, about 35-45 wt % of a substantially neutral film-forming acrylic resin, about 2-7 wt % nonionic perfluoroalkyl-containing oligomer surfactant, about 0.0 to about 0.5 wt % modifying acrylic emulsion resin, and about 0.0 to about 1.5 wt % plasticizer.

5. The method of claim 1, wherein the substrate is glass.

6. The method of claim 1, wherein the substrate is glass having a label thereon.

7. The method of claim 6, wherein the label is a ceramic label.

8. The method of claim 7, wherein the glass is in the form of a bottle.

9. The method of claim 1, wherein the composition is applied to the substrate with a spraying device.

10. The method of claim 9, wherein the composition is applied by hydraulic spraying.

11. The method of claim 10, wherein the spraying is applied through an enclosure slit having a width of the bottle.

12. The method of claim 10, wherein the applied composition is air dried under ambient conditions in less than five minutes.

13. A composition that cures in ambient conditions to form a film substantially impenetrable to heavy metals, comprising:
water;
a water-miscible organic solvent;
a water-borne (i) polyurethane, (ii) substantially neutral acrylic, or (iii) substantially neutral acrylic emulsion resin, each of the (i) polyurethane, (ii) substantially neutral acrylic, or (iii) substantially neutral acrylic emulsion resin having a Tg of 25° C. or less; and
a hydrophobic surfactant.

14. The composition of claim 13 comprising:
about 5-40 wt % water;
about 10-75 wt % water-miscible organic solvent;
about 5-70 wt % water-borne (i) polyurethane, (ii) substantially neutral acrylic, or (iii) substantially neutral acrylic emulsion resin;
about 0.1-8 wt % hydrophobic surfactant;
0 up to 20 wt % modifying resin having a Tg higher than the water-borne resin, and
0 up to 10 wt % plasticizer;
wherein the composition does not contain solids having a major dimension greater than 0.0025 cm.

15. The composition of claim 14, wherein the water-miscible solvent is an alcohol.

16. The composition of claim 15, wherein the alcohol is ethanol.

17. The composition of claim 16 that comprises:
about 15-20 wt % water;
about 30-40 wt % ethanol;
about 35-45 wt % of a substantially neutral film-forming acrylic resin;
about 2-7 wt % nonionic perfluoroalkyl-containing oligomer surfactant;
about 0.0 to about 0.5 wt % modifying acrylic emulsion resin; and
about 0.0 to about 1.5 wt % plasticizer.

18. A method of making a composition which cures to form a film substantially impenetrable to heavy metals, comprising:
a. combining a hydrophobic surfactant and a water miscible organic solvent to form a combination, wherein the water-miscible organic solvent is an alcohol;
b. combining water with the resultant combination of step a.; and
c. combining a water-borne resin selected from a water-borne (i) polyurethane, (ii) substantially neutral acrylic, or (iii) substantially neutral acrylic emulsion resin, each of the (i) polyurethane, (ii) substantially neutral acrylic, or (iii) substantially neutral acrylic emulsion resin having a Tg of 25° C. or less, with the surfactant/water miscible organic solvent/water combination of step b.

19. The method of claim 18, wherein:
the alcohol is ethanol;
the surfactant is a perfluoroalkyl-containing oligomer; and
the water-borne resin is a substantially neutral, film-forming acrylic resin.

* * * * *